Patented Feb. 6, 1945

2,369,059

UNITED STATES PATENT OFFICE 2,369,059

PECTOUS FOOD PRODUCT

Herbert T. Leo, Clarence C. Taylor, and John W. Lindsey, Anaheim, Calif., assignors to Mutual Citrus Products Company, Anaheim, Calif., a corporation of California No Drawing. Application January 19, 1942, Serial No. 427,296

3 Claims. (Cl. 99—132)

This invention relates to a pectous food product containing sugar and citric acid and adapted for household use in the preparation of jellies, jams, and the like.

Conventional food products on this order may comprise, for instance, 10 pounds 100 grade pectin, 5 pounds citric acid and 85 pounds of dextrose. Although such products keep satisfactorily for fairly long periods of time, yet the products will eventually cake and the jellying properties of the pectin will gradually deteriorate due to the effect of the moisture content of the dextrose (9%) and the water of crystallization (8½%) of the citric acid.

It is, therefore, an object of the present invention to provide a pectous food product containing sugar and citric acid that will keep indefinitely.

Other and further objects of this invention will become apparent from the following description and appended claims.

In our co-pending application entitled "Food product made from lemon juice," filed of even date herewith, we have disclosed a filtered and subsequently spray-dried lemon juice powder product containing the citric acid, citrate and ascorbic acid content of lemon juice together with dextrinized glucose, in particular, corn syrup solids, but substantially devoid of lemon oil, living bacteria and active enzymes. We have now discovered that pectous preparations made up with such lemon juice powder, pectin and anhydrous dextrose keep almost indefinitely without caking and without deterioration of the jellying properties of the pectin. These excellent keeping qualities are attributed to the low moisture content of the novel pectous product. The powdered lemon juice contains less than 1% moisture. The anhydrous dextrose contains 1% moisture, and the pectin contains 5% moisture. For practical purposes the resulting mixture can be considered perfectly dry.

While the relative amounts of pectin, powdered lemon juice and anhydrous dextrose may be varied within the ranges conventional in preparing pectous food products of the nature indicated, a preferred composition will include 10 pounds 100 grade pectin, 50 pounds powdered lemon juice containing corn syrup solids (prepared by spray-drying a 30° to 50° Brix mixture of 70 gallons of lemon juice and 350 pounds dextrinized glucose) and 40 pounds anhydrous dextrose.

The pectin used in the products of the present invention need not be treated to make the pectin set at a low temperature and at a high pH value, as is required in making conventional pectous preparations on this order. Nor is an addition of buffer salts to the products of the present invention required to establish a suitable pH value, for the powdered lemon juice contains the potassium, magnesium and like citrates naturally present in lemon juice, which act as buffer salts. The pectous preparation of this invention further contains the natural vitamin C of the lemon juice. The fact that the lemon juice has been filtered prior to being spray-dried insures a clear finished jelly, unlike the products made from unfiltered conventional preparations.

Many details of composition may be varied within a wide range without departing from the principles of this invention and it is therefore not our intention to limit the patent granted on this invention otherwise than necessitated by the scope of the appended claims.

We claim as follows:

1. A household jelly and jam preparation ingredient including rapid-set pectin, anhydrous dextrose and the anhydrous solids content of mixed corn syrup and sterile lemon juice.

2. A household jelly and jam preparation ingredient including rapid-set pectin, anhydrous dextrose and the anhydrous solids contents of a mixture of sterile lemon juice and corn syrup.

3. A household jelly and jam preparation ingredient including about 10 parts by weight of 100 grade rapid-set pectin, 40 parts anhydrous dextrose and 50 parts of the anhydrous solids content of a mixture of sterile lemon juice and corn syrup.

HERBERT T. LEO.
CLARENCE C. TAYLOR.
JOHN W. LINDSEY.